United States Patent
Ji et al.

(10) Patent No.: US 10,057,038 B2
(45) Date of Patent: Aug. 21, 2018

(54) METHOD AND APPARATUS FOR FEEDBACK IN MOBILE COMMUNICATION SYSTEM

(71) Applicants: Samsung Electronics Co., Ltd., Gyeonggi-do (KR); Industry-Academic Cooperation Foundation Yonsei University, Seoul (KR)

(72) Inventors: Hyoungju Ji, Seoul (KR); Sanggeun Lee, Seoul (KR); Younsun Kim, Gyeonggi-do (KR); Chungyong Lee, Seoul (KR); Sangwon Park, Seoul (KR)

(73) Assignees: Samsung Electronics Co., Ltd. (KR); Industry-Academic Cooperation Foundation Yonsei University (KR)

( * ) Notice: Subject to any disclaimer, the term of this patent is extended or adjusted under 35 U.S.C. 154(b) by 169 days.

(21) Appl. No.: 15/153,132

(22) Filed: May 12, 2016

(65) Prior Publication Data

US 2016/0338052 A1 Nov. 17, 2016

(30) Foreign Application Priority Data

May 13, 2015 (KR) ........................ 10-2015-0066461

(51) Int. Cl.
| | | |
|---|---|---|
| *H04L 5/14* | (2006.01) | |
| *H04L 5/00* | (2006.01) | |
| *H04W 72/04* | (2009.01) | |
| *H04W 24/08* | (2009.01) | |
| *H04L 1/12* | (2006.01) | |
| *H04W 72/12* | (2009.01) | |

(52) U.S. Cl.
CPC .............. *H04L 5/0055* (2013.01); *H04L 1/12* (2013.01); *H04L 5/1469* (2013.01); *H04W 72/1289* (2013.01)

(58) Field of Classification Search
CPC ........... H04W 72/0446; H04W 72/042; H04W 72/0413; H04W 24/08; H04L 5/0055; H04L 5/14
See application file for complete search history.

(56) References Cited

U.S. PATENT DOCUMENTS

| | | | |
|---|---|---|---|
| 8,553,593 B2 * | 10/2013 | Lim | H04W 72/042 370/281 |
| 8,750,091 B2 | 6/2014 | Rangan et al. | |
| 8,824,343 B2 | 9/2014 | Zhu | |
| 9,042,410 B2 * | 5/2015 | Lim | H04L 27/2602 370/330 |
| 9,215,060 B2 * | 12/2015 | You | H04L 5/14 |
| 9,596,071 B1 * | 3/2017 | Naim | H04L 5/1438 |
| 9,768,918 B2 * | 9/2017 | Park | H04L 1/1861 |

(Continued)

*Primary Examiner* — Rasheed Gidado
(74) *Attorney, Agent, or Firm* — The Farrell Law Firm, P.C.

(57) ABSTRACT

A method and apparatus for feedback in a mobile communication system are provided. The method of feedback transmission for a user equipment (UE) in a wireless communication system includes receiving control information indicating whether a subframe of an uplink band is allocated for a downlink from a base station (BS), receiving data from the BS in at least three subframes according to the control information, and sending the BS feedback for the data received in the at least three subframes using transmission time interval (TTI) bundling.

20 Claims, 10 Drawing Sheets

(56) References Cited

U.S. PATENT DOCUMENTS

| | | | |
|---|---|---|---|
| 2011/0141952 A1* | 6/2011 | Wang | H04L 1/1812 370/294 |
| 2012/0082085 A1* | 4/2012 | Horiuchi | H04B 7/15542 370/315 |
| 2013/0194982 A1* | 8/2013 | Fwu | H04L 5/0035 370/280 |
| 2013/0250924 A1* | 9/2013 | Chen | H04L 1/1819 370/336 |
| 2014/0098761 A1* | 4/2014 | Lee | H04W 74/006 370/329 |
| 2014/0247801 A1* | 9/2014 | Oizumi | H04L 5/0037 370/329 |
| 2015/0280876 A1* | 10/2015 | You | H04L 5/0048 370/329 |

* cited by examiner

METHOD AND APPARATUS FOR FEEDBACK IN MOBILE COMMUNICATION SYSTEM

PRIORITY

This application claims priority under 35 U.S.C. § 119(a) to a Korean Patent Application Serial No. 10-2015-0066461 which was filed on May 13, 2015, in the Korean Intellectual Property Office, the entire disclosure of which is incorporated herein by reference.

BACKGROUND

1. Field of the Disclosure

The present disclosure generally relates to a method and apparatus for providing feedback in a mobile communication system, and more particularly, to a method and apparatus for providing feedback on received data in a flexible duplex system.

2. Description of the Related Art

To cope with the increasing demand for wireless data traffic after commercialization of fourth generation (4G) communication systems, efforts are underway to develop enhanced fifth generation (5G) or pre-5G communication systems. As such, 5G or pre-5G communication systems are referred to as beyond 4G (B4G) communication systems, long term evolution advanced (LTE-A) or post LTE-A systems. To achieve high data rates, use of the extremely high frequency (mm Wave) band (e.g. 60 GHz band) is considered for use in 5G communication systems. To reduce the propagation pathloss and increase propagation distance in the mm Wave band, use of various technologies such as beamforming, massive multiple input multiple output (MIMO), full dimensional MIMO (FD-MIMO), array antennas, analog beamforming and large scale antennas are under discussion for 5G communication systems. To enhance system networks, various technologies such as evolved or advanced small cell, cloud radio access network (cloud RAN), ultra-dense network, device-to-device (D2D) communication, wireless backhaul, moving network, cooperative communication, coordinated multi-points (CoMP) and interference cancellation are under development for 5G communication systems. In addition, for 5G communication systems, hybrid frequency shift keying (FSK) and quadrature amplitude modulation (QAM) modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced communication systems.

The Internet is evolving from a human centric network where humans create and consume information into the Internet of things (IoT) where distributed elements or things process and exchange information. Big data processing through cloud servers and IoT technology are being combined into the Internet of everything (IoE). To realize IoT services, base technologies such as sensing, wired/wireless communication and network infrastructure, service interfacing and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add value to human life. Through convergence and combining existing information technologies and communication technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing may be an example of convergence of 5G communication technology and IoT technology.

With the popularization of smartphones in recent years, demand for multimedia services such as video calls has rapidly increased, causing an explosive increase in data traffic. To meet such high demand for data traffic, domestic and foreign mobile communication operators have employed LTE and 4G LTE-A systems, which are based on orthogonal frequency division multiplexing (OFDM) technologies. To address the increasing data traffic demand, active efforts are underway worldwide to develop post LTE and 5G mobile communication technologies.

Meanwhile, flexible duplexing is a traffic adaptation scheme based on frequency division duplexing (FDD) in which some of uplink resources with relatively less traffic are used for downlink data transmission. To apply such traffic adaptation, it is necessary to introduce a scheme for transmitting control information between the base station and the user equipment and a scheme for providing feedback on received data.

SUMMARY

Aspects of the present disclosure are to address at least the above mentioned problems and/or disadvantages and to provide at least the advantages described below. Accordingly, an aspect of the present disclosure is to provide a method and apparatus that realizes a flexible duplex system in which a base station may send control information indicating subframes of the uplink band allocated for the downlink and user equipment may receive data on the basis of the control information and send feedback on data reception to the base station.

In accordance with another aspect of the present disclosure, a method of feedback transmission for a user equipment in a wireless communication system is provided. The method includes receiving control information indicating whether a subframe of an uplink band is allocated for a downlink from a base station (BS), receiving data from the BS in at least three subframes according to the control information, and sending feedback to the BS for the data received in the at least three subframes using transmission time interval (TTI) bundling.

In accordance with another aspect of the present disclosure, a method of feedback reception for a base station in a wireless communication system is provided. The method includes sending control information indicating whether a subframe of an uplink band is allocated for a downlink to a user equipment (UE), sending data to the UE in at least one subframe according to the control information, and receiving feedback for the data sent in the at least one subframe from the UE using transmission time interval (TTI) bundling.

In accordance with another aspect of the present disclosure, a user equipment capable of feedback transmission in a wireless communication system is provided. The user equipment includes a communication unit configured to send and receive signals and a control unit configured to control a process of receiving control information indicating whether a subframe of an uplink band is allocated for a downlink from a base station (BS), receiving data from the BS in at least three subframes according to the control information, and sending the BS feedback for the data received in the at least three subframes using transmission time interval (TTI) bundling.

In accordance with another aspect of the present disclosure, a base station capable of feedback reception in a wireless communication system is provided. The base station includes a communication unit configured to send and receive signals, and a control unit configured to control a process of sending control information indicating whether a subframe of an uplink band is allocated for a downlink to a user equipment (UE), sending data to the UE in at least one subframe according to the control information, and receiving feedback for the data sent in the at least one subframe from the UE using transmission time interval (TTI) bundling.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
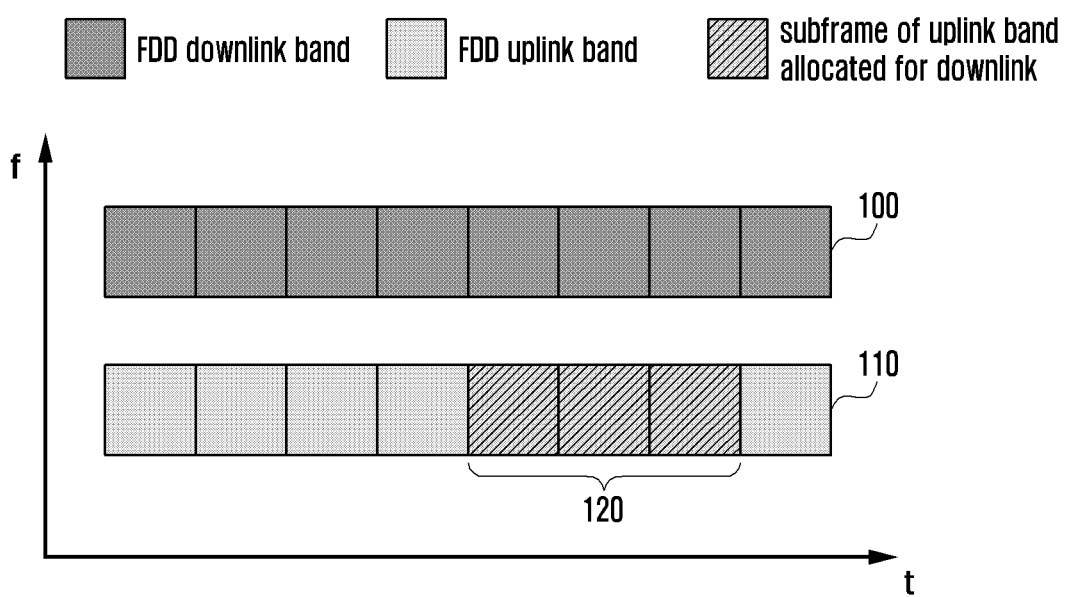
FIG. 1 illustrates flexible duplexing in a wireless communication system, according to an embodiment of the present disclosure.

Hereinafter, embodiments of the present disclosure are described in detail with reference to the accompanying drawings.

In the following description of embodiments, descriptions of well-known functions and structures incorporated herein may be omitted to avoid obscuring the subject matter of the present disclosure and for clarity and conciseness.

The aspects, features and advantages of certain embodiments of the present disclosure will be more apparent from the following detailed description taken in conjunction with the accompanying drawings. The description of the various embodiments is to be construed as examples only and does not describe every possible instance of the present disclosure. It should be apparent to those skilled in the art that the following description of various embodiments of the present disclosure is provided for illustration purposes only and does not limit the present disclosure as defined by the appended claims and their equivalents. The same or similar reference symbols are used throughout the description to refer to the same or similar elements.

It is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a non-transitory computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the terms "unit", "module" and the like may refer to a software component or hardware component such as an FPGA or ASIC capable of carrying out a function or an operation. However, the term "unit" and the like is not limited to hardware or software. A unit and the like may be configured to reside in an addressable storage medium or to drive one or more processors. Units and the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to create large components and units. Components and units may be configured to drive a device, or one or more processors in a secure multimedia card.

Beyond 4G (B4G) mobile communication technologies expected to be commercially available around the year 2020 aim to achieve a data rate of 1000 times or more than that of the LTE-A system. To this end, active efforts are underway to develop and standardize B4G core technologies, such as massive multiple-input multiple-output (MIMO), licensed-assisted access (LAA), small cell networking, carrier aggregation (CA), and dynamic time division duplexing (dynamic TDD).

In particular, dynamic TDD attempts to correct the asymmetry between downlink and uplink traffic demands by adjusting the ratio between the number of downlink subframes and the number of uplink subframes according to the traffic demand ratio. Dynamic TDD may achieve a significant increase in the bandwidth supporting a user equipment (UE) by use of an additional band, and may enable downlink and uplink traffic adaptation according to bandwidth utilization in the future. However, dynamic TDD cannot support countries not supporting TDD or operators using FDD bands only, and the CA system has to use an additional band and has difficulty in flexible downlink/uplink traffic adaptation.

In the case of a flexible duplex system, there is a need for a scheme that enables the base station scheduling uplink subframes to notify the user equipment of whether to use uplink subframes for the downlink. In addition, unlike the FDD system where the ratio of uplink resources to downlink resources is 1:1, the amount of uplink resources decreases as some uplink resources are used for the downlink. Hence, there is a need to modify the feedback algorithm used in the FDD system for handling hybrid automatic repeat request (HARQ) messages.

FIG. 1 illustrates flexible duplexing in a wireless communication system, according to an embodiment of the present disclosure.

Referring to FIG. 1, in flexible duplexing, subframes 120 of the FDD uplink band 110 are allocated for the downlink, enabling the FDD system to adapt to downlink traffic demand.

A brief description is given of enhanced interference management and traffic adaptation (eIMTA) and CA used in the LTE system for traffic adaptation. The eIMTA feature enables more flexible TDD reconfiguration in comparison to the existing TDD system, expanding the effect of TDD traffic adaptation. In relation to eIMTA, there are considerations regarding TDD reconfiguration, HARQ-acknowledgement (ACK) feedback timing, and other features. The CA feature supports a user equipment using two or more bands. In the early stage of CA, only downlink bands are additionally used for downlink traffic adaptation. TDD-FDD CA aims to expand the effect of traffic adaptation by mixing TDD and FDD.

Flexible duplexing enables the FDD system to use uplink subframes for the downlink, achieving downlink traffic adaptation. According to an embodiment of the present disclosure, a subframe of the uplink band may be split and a portion of the subframe may be allocated for the downlink (a subframe is a time domain resource). In this case, a portion of the uplink band is used for the downlink only when downlink traffic is significantly greater than uplink traffic, taking advantage of both FDD and TDD. In addition, as flexible duplexing is largely based on FDD, it may also be applied to CA.

In the FDD system, the base station may obtain channel state information (CSI) of the uplink band by measuring an uplink pilot signal received from the UE. To obtain the CSI of the downlink band, it is necessary for the UE to receive downlink CSI by measuring a downlink pilot signal from the base station and to feedback a precoding matrix indicator (PMI) corresponding to the quantized downlink CSI. Hence, while the uplink CSI includes an estimation error due to noise during measurement, the downlink CSI includes not only an estimation error but also a quantization error. This indicates that the uplink channel has relatively high effective channel gain compared to the downlink channel. Consequently, under the assumption of reciprocity between the uplink and downlink channels, the flexible duplex system enabling downlink transmission in the uplink band may utilize a downlink channel with higher effective channel gain.

Figure 2:
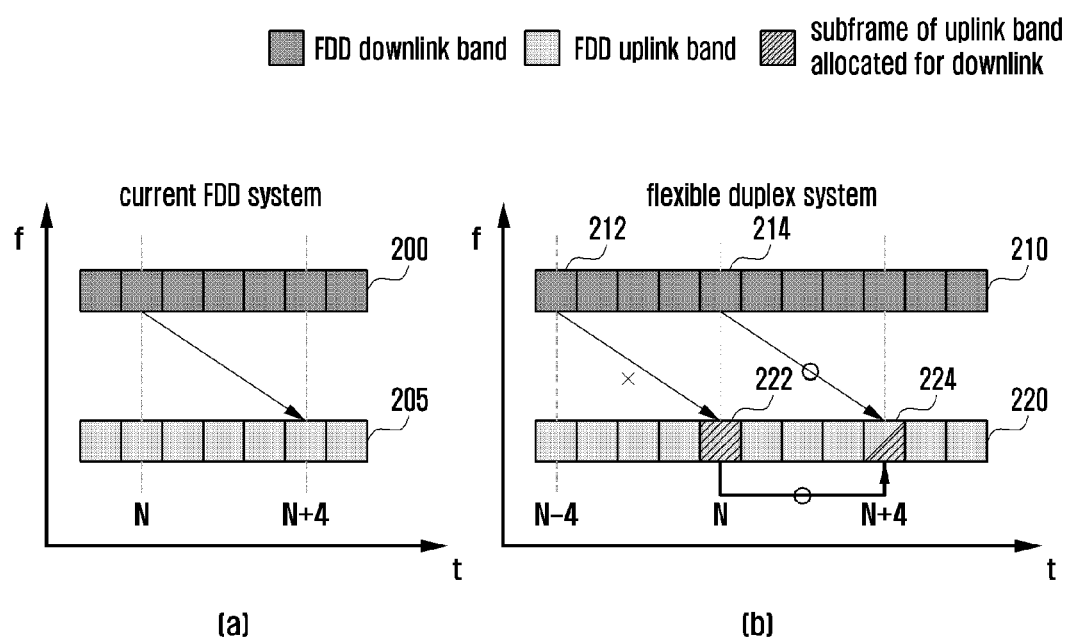
FIG. 2 illustrates a feedback scheme for a user equipment in a flexible duplex system, according to an embodiment of the present disclosure.

FIG. 2 illustrates a feedback scheme for a user equipment in the flexible duplex system, according to an embodiment of the present disclosure.

Graph a of FIG. 2 illustrates a feedback scheme in the existing FDD system, and graph b of FIG. 2 illustrates a feedback scheme in the flexible duplex system.

Referring to graph a of FIG. 2, in the FDD system, the UE receives downlink data on the physical downlink shared channel (PDSCH) at subframe N, and then feeds a HARQ response (ACK/NACK/DTX), indicating the result of error detection, on the physical uplink control channel (PUCCH) at subframe N+4 back to the base station. After reception of the feedback, the base station determines whether to retransmit the data sent on the PDSCH at subframe N on the basis of HARQ-ACK, and performs PDSCH retransmission or schedules new PDSCH transmission.

Referring to graph b of FIG. 2, as a portion of the uplink band is used for the downlink in the flexible duplex system, the UE may be unable to send HARQ feedback in the same manner as the FDD system. The UE may suffer a problem caused by the lack of HARQ-ACK feedback or collision between HARQ-ACK feedback timings for PDSCH of the downlink band and uplink band.

More specifically, for the PDSCH received at subframe N−4 212 of the FDD downlink band 210, the UE has to send feedback to the base station on the PUCCH at subframe N 222 of the FDD uplink band 220. However, when subframe N 222 of the FDD uplink band 220 is allocated for the downlink, the UE is unable to send feedback for the PDSCH received at subframe N−4 212.

In addition, for the PDSCH received at subframe N 214 of the FDD downlink band 210, the UE has to send feedback on the PUCCH at subframe N+4 224 of the FDD uplink band 220. Further, feedback on the PUCCH at subframe N 224 allocated for the downlink is to be sent at subframe N+4 224, colliding with feedback transmission for subframe N 214. That is, when one subframe of the FDD uplink band 220 is allocated for the downlink, a problem of HARQ feedback timing collision may arise for at least three subframes as described above. To address the above problem in the flexible duplex system, a description is given of a scheme for sending control information and HARQ feedback messages to the base station.

Figure 3:
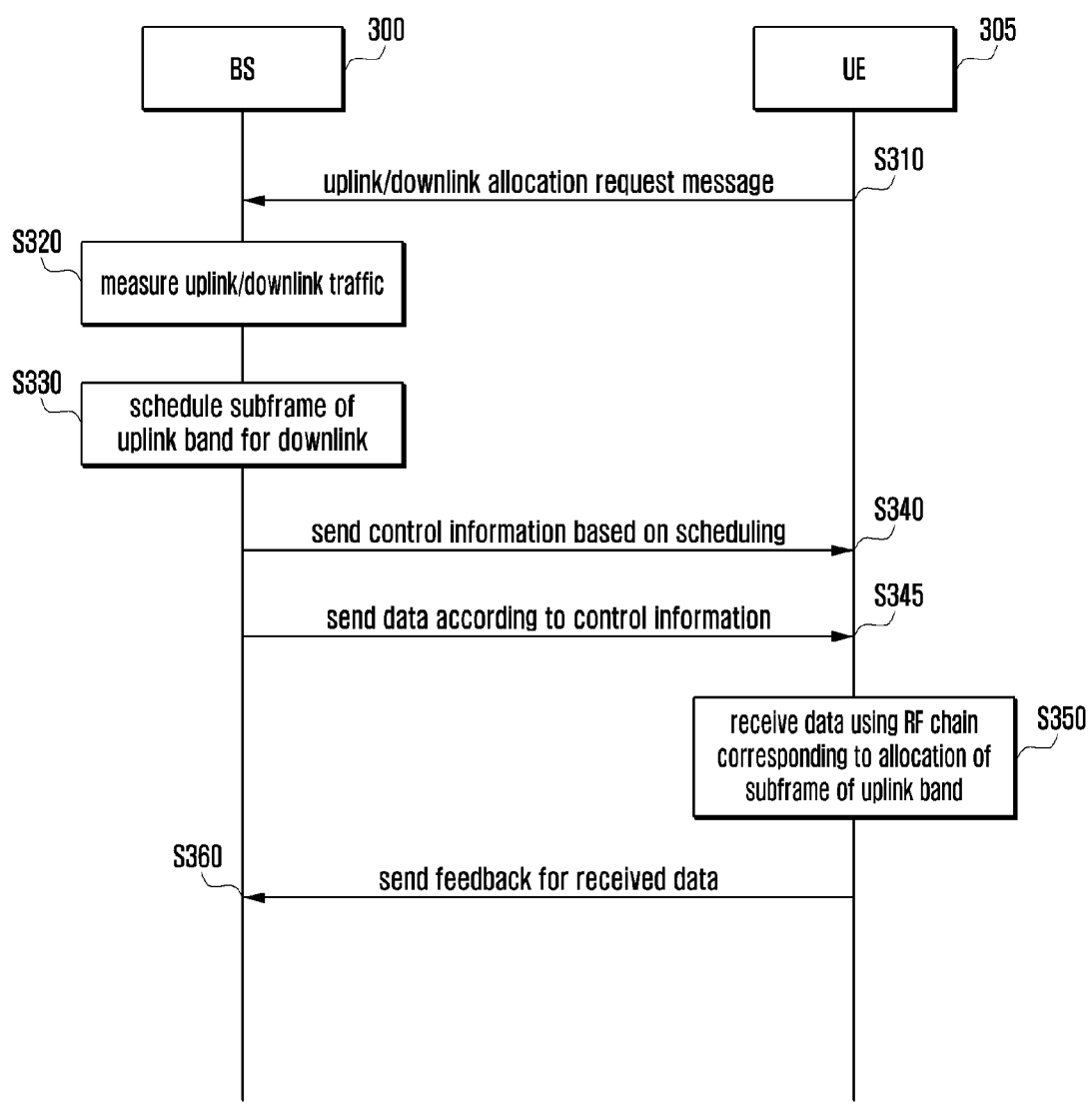
FIG. 3 is a flow diagram illustrating operations of a user equipment and base station in a flexible duplex system, according to an embodiment of the present disclosure.

FIG. 3 is a flow diagram illustrating operations of a user equipment and base station in the flexible duplex system, according to an embodiment of the present disclosure.

At step S310, to receive uplink/downlink services, the UE 305 sends an uplink/downlink allocation request message to the BS 300. Upon reception of the allocation request message, at step S320, the BS 300 measures the ratio between uplink traffic and downlink traffic for the UE 305. Thereafter, if the BS 300 is able to conduct resource scheduling based on flexible duplexing, at step S330, the BS 300 performs scheduling by allocating a subframe of the uplink band for the downlink, in consideration of the measured ratio between uplink traffic and downlink traffic.

At step S340, the BS 300 sends control information based on the scheduling result to the UE 305. Here, the BS 300 may notify the UE 305 of the subframe of the uplink band allocated for the downlink. At step S345, the BS 300 sends data to the UE 305 according to the control information. At step S350, the UE 305 receives data through an RF (radio frequency) chain according to the presence of an uplink subframe allocated for the downlink. That is, the UE 305 may receive a notification indicating presence of an uplink subframe allocated for the downlink, and receive or send data using an RF chain according to the presence or absence of an uplink subframe allocated for the downlink. After data reception, at step S360, the UE 305 sends feedback for the received data to the BS 300. Next, a description is given of a scheme to notify the UE of whether a subframe of the uplink band is allocated for the downlink.

In the existing FDD LTE system, different frequency bands are used for the downlink and the uplink. Hence, the UE operating on FDD uses different RF chains for the downlink band and uplink band assigned by the BS. That is, the UE uses only an uplink chain for the uplink band and uses only a downlink chain for the downlink band.

In the flexible duplex system, the UE is able to both send uplink data and receive downlink data through the uplink frequency band. Therefore, it is necessary for the UE to use both an uplink RF chain and a downlink RF chain for the uplink band. In addition, as the BS divides time domain resources of one band into two parts to be allocated for the downlink and the uplink, the UE has to be aware of the downlink/uplink switching point in order to switch an RF chain corresponding to a subframe allocated for the uplink or downlink. Hence, in the flexible duplex system, the BS needs a signaling mechanism to notify the UE of whether a subframe of the uplink band is allocated for the downlink. The present disclosure provides two approaches as follows.

The first notification scheme includes directly notifying the UE of whether a subframe of the uplink band is allocated for the downlink on a subframe basis.

The second notification scheme includes sending configuration information index of the flexible duplex system.

In the first notification scheme, whether a subframe of the uplink band is allocated for the downlink is directly notified to the UE on a subframe basis. In flexible duplexing, for adaptation of heavy downlink traffic, the BS may schedule resources so that some uplink resources may be used for the downlink. As downlink scheduling in the uplink band may be carried out on a subframe basis, the BS may notify the UE of whether a subframe of the uplink band is allocated for the downlink at each subframe of the downlink band. The first notification scheme permits high flexibility in downlink traffic adaptation. Hence, as the UE is notified of whether each subframe of the uplink band is allocated for the downlink, it may use a corresponding RF chain.

In the first notification scheme, the UE needs to be notified of whether a subframe of the uplink band is allocated for the downlink only. Hence, for control signaling, the BS only has to use an additional 1-bit flag for notification to support flexible duplexing. Here, 1-bit flag signaling for the first notification scheme may be realized by using a newly-defined control signal or using an existing control signal.

First, a description is given of defining a new control signal for the first notification scheme. To notify the UE of whether a subframe of the uplink band is allocated for the downlink, the BS may newly define a "band borrowing notification field" in the downlink control information (DCI) format. The band borrowing notification field may be used as a 1-bit flag signal indicating whether a subframe of the uplink band is allocated for the downlink. For example, when the band borrowing notification field is set to '0', this may mean that the corresponding subframe of the uplink band is not allocated for the downlink, and when the band borrowing notification field is set to '1', this may mean that the corresponding subframe of the uplink band is allocated for the downlink.

The "band borrowing notification field" in the DCI format is a term for a 1-bit flag signal indicating whether a subframe of the uplink band is allocated for the downlink. Such a 1-bit flag signal may also be referred to as "subframe switching field (SSF)". In the following description, the terms "band borrowing notification field" and "subframe switching field" may be used interchangeably with each other. Further, this 1-bit flag signal may be referred to as "subframe borrowing indicator (SBI)".

Second, a description is given of utilizing an existing control signal for the first notification scheme. To notify the UE of whether a subframe of the uplink band is allocated for the downlink, the BS may use the carrier indicator field (CIF). In the case of CA, the BS uses a 3-bit carrier indicator field in the PDCCH (physical downlink control channel) DCI format to notify the UE of the secondary carrier component (SCC) used by the secondary serving cell (SSC). The BS of an FDD cell not supporting CA may use one bit of the CIF or a code point thereof as a signal indicating whether a subframe of the uplink band is allocated for the downlink.

Next, a description is given of the second notification scheme in which the BS sends the UE a configuration information index of the flexible duplex system. In the TDD system, time domain resources are separately allocated to the uplink and the downlink to achieve traffic load adaptation between the uplink and the downlink. There are seven pre-defined TDD configurations to allocate time domain resources to the uplink and the downlink. These TDD configurations may support uplink to downlink traffic ratios from 1:9 to 3:2 in terms of the number of subframes allocated to the uplink and the downlink. The TDD configurations may be used for the eIMTA feature serving as a user-specific TDD system.

For flexible duplexing, traffic adaptation between the uplink and downlink may be achieved by adjusting the number of uplink subframes and downlink subframes, according to uplink traffic and downlink traffic by use of the TDD configurations. To this end, flexible duplex configurations may be defined and used. In addition, the BS needs a reconfiguration feature for more flexible traffic load adaptation. The BS may notify the UE of a new configuration index by use of system information, radio resource control (RRC) signaling, medium access control (MAC) signaling, or physical layer (PHY) signaling.

When a UE is notified of a flexible duplex configuration index by the BS, the UE may use a downlink RF chain or uplink RF chain at a downlink subframe or uplink subframe according to the configuration indicated by the notified index. Such flexible duplex configurations and indices may be agreed upon between the UE and the BS and stored in advance. Table 1 illustrates flexible duplex configurations with a period of 5 ms.

TABLE 1

|  | Subframe index | | | | |
| --- | --- | --- | --- | --- | --- |
| Flexible duplex configuration | 0 | 1 | 2 | 3 | 4 |
| 0 (current FDD uplink band) | U | U | U | U | U |
| 1 | D | S | U | U | U |
| 2 | D | D | S | U | U |
| 3 | D | D | D | S | U |
| 4 | D | D | D | D | S |

In Table 1, 'U' and 'D' indicate that the corresponding subframe of the uplink band is used for the uplink and the downlink, respectively. 'S' indicates that the subframe corresponds to the special subframe in TDD configurations. The special subframe labeled 'S' is used to provide a guard interval for downlink to uplink switching in the uplink band.

The configurations shown in Table 1 may support downlink to uplink traffic ratios from 3:2 to 9:1. Various other traffic ratios may also be supported according to reconfiguration periods and configuration tables. Table 1 is an example of an embodiment of the present disclosure. However, the present disclosure is not limited to the disclosed embodiments.

There are trade-offs between the first notification scheme and the second notification scheme in terms of flexibility in downlink traffic adaptation and signaling overhead. The first notification scheme, where every subframe of the uplink band is notified for downlink allocation, may have high flexibility in downlink traffic adaptation. However, the first notification scheme requires control signal transmission for each subframe and may have high signaling overhead in comparison to the second notification scheme requiring periodic reconfiguration of subframe allocation only. In particular, the second notification scheme may reduce signaling overhead by adjusting the reconfiguration period when high flexibility in traffic adaptation is not required.

The first and second notification schemes are an embodiment of a method for the BS to notify the UE of whether a subframe of the uplink band is allocated for the downlink, and the present disclosure is not limited thereto. The first and second notification schemes may be used separately, or in combination. For example, the BS may use the first notification scheme during a first time duration and use the second notification scheme during a second time duration. For CA with flexible duplexing, the BS may use the first notification scheme for a first frequency band and use the second notification scheme for a second frequency band.

As described above, the BS may notify the UE of whether a subframe of the uplink band is allocated for the downlink. Next, a description is given of downlink control channel scheduling after a subframe of the uplink band is allocated for the downlink. Downlink control channel scheduling may be performed by use of cross-carrier scheduling, PDCCH, and enhanced PDCCH (ePDCCH).

In the case of CA, cross-carrier scheduling may be used to prevent the control signal of an SSC from causing interference to the control signal of a neighboring cell. In cross-carrier scheduling, a PDCCH is not allocated at a downlink subframe of the SSC but a PDCCH for the SSC is scheduled at a downlink subframe of the primary serving cell (PSC). Here, as the cross-carrier scheduled PDCCH for the SSC is transmitted together with the CIF, the UE may identify the band associated with the PDCCH having been received from the PSC.

In the case of flexible duplexing, the BS may perform cross-carrier scheduling to avoid interference caused by the PUCCH of a neighbor cell. This indicates that the PDCCH having been assigned to the uplink in the uplink band is scheduled in the downlink band together with the PDCCH assigned to the subframe allocated for the downlink and only the physical downlink shared channel (PDSCH) is scheduled in the uplink band. Here, it is possible to use two approaches for PDSCH scheduling according to the amount of interference caused by the PUCCH of a neighbor cell. First, it is possible to use all the downlink subframes scheduled in the uplink band for the PDSCH. Next, to avoid interference caused by the PUCCH, among the downlink subframes scheduled in the uplink band, it is possible not to use the PUCCH region for PDSCH transmission.

When a cell supporting flexible duplexing uses a part of the uplink band for the downlink, the cell may receive an interference signal from a neighboring cell using the same uplink band. However, as the PDCCH and PUCCH positions at the downlink subframe and uplink subframe are different, interference between control channels is less severe compared with a carrier aggregation system. That is, in the time domain, the PUCCH is mapped to all symbols of a given frequency and the PDCCH is mapped to three OFDM symbols at most, the PUCCH does not cause severe interference to the PDCCH. Hence, the need for cross-carrier scheduling in flexible duplexing is relatively low compared with carrier aggregation. As such, in the case of flexible duplexing, the BS may use a second approach, where control information is transmitted on the PDCCH in the regular downlink band.

Second, when a subframe of the uplink band is allocated for the downlink, the BS may send corresponding control information on the PDCCH in the regular downlink band. As the flexible duplex system may utilize downlink subframes of the existing LTE system, the BS may directly transmit the PDCCH associated with a downlink subframe of the uplink band at the corresponding subframe.

Third, when a subframe of the uplink band is allocated for the downlink in flexible duplexing, the BS may send corresponding control information on the ePDCCH. As the number of UEs to be supported rapidly increases, the LTE system may experience a shortage of the capacity of the PDCCH when composed of three OFDM symbols. To support a UE in PDCCH capacity shortage, in the LTE-Advanced system, the ePDCCH may be arranged in the PDSCH region. That is, unlike the second approach, it is possible to increase capacity by transmitting control information on the ePDCCH which is mapped to all symbols of a given frequency in addition to three OFDM symbols. In the above description, three approaches are discussed for transmitting control information from the BS to the UE. However, the present disclosure is not limited thereto. The BS may use the above three approaches separately or in combination.

In flexible duplexing, after sending information regarding whether a subframe of the uplink band is allocated for the downlink and a corresponding downlink control channel, the BS sends data to the UE. Upon reception of the data, the UE sends feedback on the received data to the BS. Next, a description is given of a scheme for the UE to send feedback to the BS in the flexible duplex system.

Figure 4:
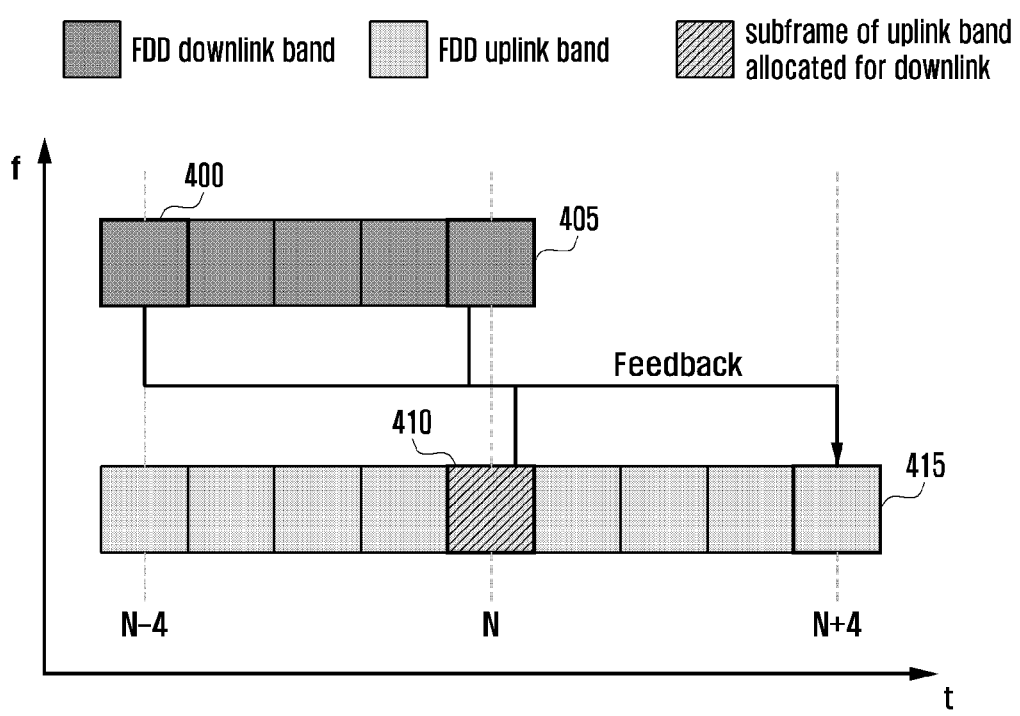
FIG. 4 illustrates a feedback scheme based on TTI bundling for a user equipment in the flexible duplex system, according to an embodiment of the present disclosure.

FIG. 4 illustrates a feedback scheme based on TTI bundling for a UE in the flexible duplex system, according to an embodiment of the present disclosure.

FIG. 4 illustrates a feedback scheme of the UE when the BS notifies the UE of whether a subframe of the uplink band is allocated for the downlink on a subframe basis according to the first notification scheme described above.

For HARQ-ACK feedback, in FDD, HARQ-ACK for PDSCH received at subframe N 405 of the downlink band is sent on PUCCH at subframe N+4 415 of the uplink band. For flexible duplexing, when subframe N 410 of the uplink band is used for the downlink, it is necessary to feedback HARQ-ACK for PDSCH received at subframe N 410 of the uplink band, for PDSCH received at subframe N−4 400 of the downlink band, and for PDSCH received at subframe N 405 of the downlink band. Here, the UE may send HARQ-ACK feedback for PDSCHs received at subframes 400, 405 and 410 by use of TTI bundling. The UE may send to the BS bundled HARQ-ACK feedback on PUCCH at subframe N+4 415 of the uplink band.

Figure 5:
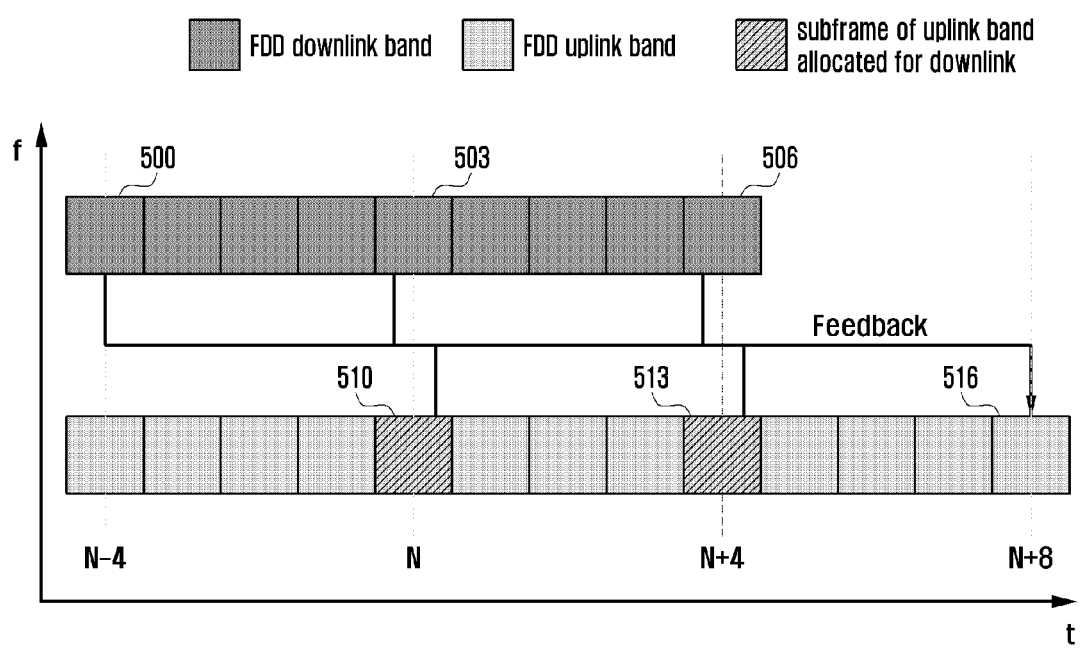
FIG. 5 illustrates a feedback scheme based on TTI bundling for a user equipment in the flexible duplex system, according to another embodiment of the present disclosure.

FIG. 5 illustrates a feedback scheme based on TTI bundling for the UE in the flexible duplex system, according to another embodiment of the present disclosure.

In FIG. 5, for HARQ-ACK feedback, it is assumed that subframe N 510 and subframe N+4 513 of the uplink band are allocated for the downlink. In this case, it is necessary to bundle HARQ-ACKs for PDSCHs sent at subframes N−4 500, N 503, and N+4 506 of the downlink band and for PDSCHs sent at subframes N 510 and N+4 513 of the uplink band. That is, it is necessary to bundle HARQ-ACKs for 5 PDSCHs sent at subframes of the downlink band and subframes of the uplink band allocated for the downlink. In using subframes N, N+4, N+8 . . . of the uplink band for the downlink, the number of bundled HARQ-ACKs increases with the increasing number of subframes used for the downlink.

This approach has a problem in that it is necessary to define all HARQ-ACK bundlings according to the number of subframes of the uplink band allocated for the downlink. When subframe N of the uplink band is used for the downlink, the BS does not use subframe N+4 for the downlink. That is, when subframe N 510 of the uplink band is used for the downlink and subframe N+4 513 is not used for the downlink, it is necessary to bundle three HARQ-ACKs only as shown in FIG. 4. This may achieve downlink/uplink traffic adaptation at a ratio of 3:1. Considering that the current LTE system allows bundling of up to four HARQ-ACKs, the number of bundled HARQ-ACKs is small, enabling support of legacy user equipment.

Figure 6:
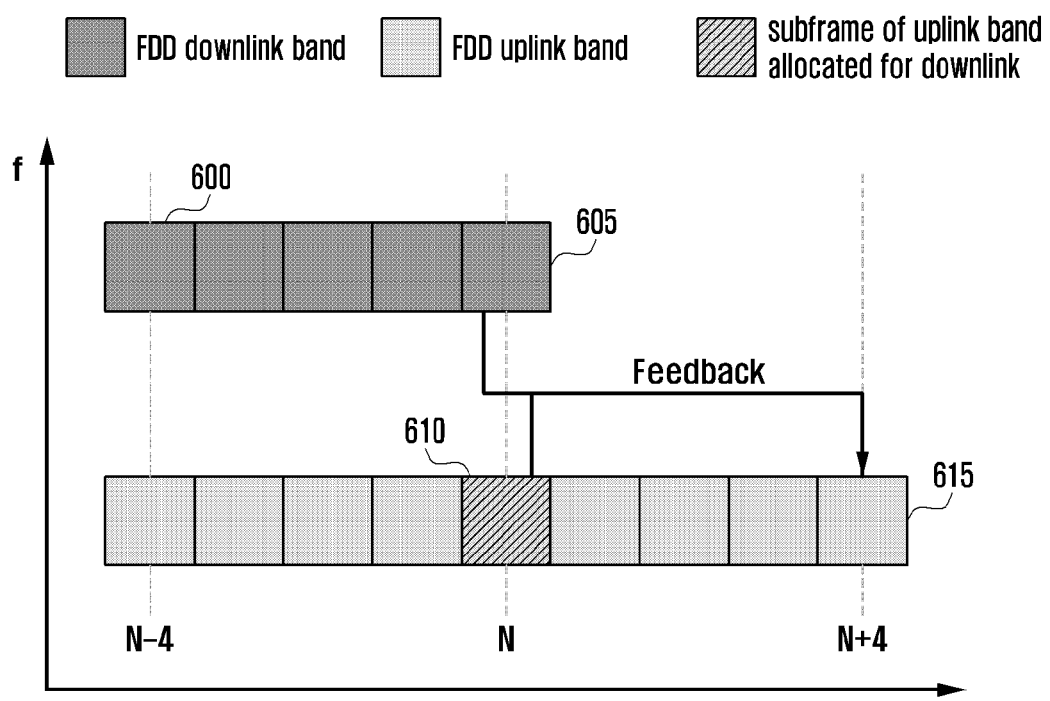
FIG. 6 illustrates a feedback scheme based on TTI bundling for a user equipment in the flexible duplex system according to another embodiment of the present disclosure.

FIG. 6 illustrates a feedback scheme based on TTI bundling for a UE in the flexible duplex system, according to another embodiment of the present disclosure.

When subframe N 610 of the uplink band is used for the downlink, it may be impossible to send HARQ-ACK feedback for PDSCH sent at subframe N−4 600 of the downlink band. As shown in FIG. 6, it is possible to skip sending HARQ-ACK feedback for PDSCH sent at subframe N−4 600 of the downlink band.

In this case, the BS not having received feedback for PDSCH sent at subframe N−4 600 of the downlink band may transmit the next data under the assumption that an ACK is received by the HARQ process. The UE may send bundled HARQ-ACK feedback on PUCCH at subframe N+4 615 for PDSCH received at subframe N 605 of the downlink band and PDSCH received at subframe N 610 of the uplink band. If an error is detected in PDSCH sent at subframe N−4 600 of the downlink band, this error may be corrected by the HARQ retransmission process.

When the BS uses the first notification scheme, as to whether a subframe of the uplink band is used for the downlink is notified at each subframe, the UE may be unable to use the special subframe serving as a guard interval for downlink-to-uplink switching. In this case, the BS may leave a portion of the PDSCH empty so that the UE may attempt to apply a timing advance.

Next, a description is given of a feedback scheme for the UE when the BS sends the UE an index to flexible duplex configuration information according to the second notification scheme.

When flexible duplex configuration information is sent, it is possible to define a feedback timing table. This HARQ-ACK feedback timing table for flexible duplex configurations may include information regarding both feedback timings and frequency bands.

Table 2 illustrates a HARQ-ACK feedback timing table for flexible duplex configurations shown in Table 1. Table 2 indicates a value of k for uplink subframe index N when HARQ-ACK feedback for PDSCH at uplink subframe N−k is sent at uplink subframe N. 'U' indicates PDSCH in the uplink band and 'D' indicates PDSCH in the downlink band.

TABLE 2

| Configuration index (traffic ratio of UL:DL) | Band | Uplink subframe index | | | | |
|---|---|---|---|---|---|---|
| | | 0 | 1 | 2 | 3 | 4 |
| 0 (1:1) | D | 4 | | 4 | 4 | 4 | 4 |
| | U | | | | | |
| 1 (2:3) | D | 4 | | | 4 | 4 | 4 |
| | U | 4 | | 5 | | |
| 2 (3:7) | D | 4 | | | | 4, 5, 6 | 4 |
| | U | 4 | | | | 6 | |
| 3 (1:4) | D | 4 | | | | | 4, 5, 6, 7 |
| | U | 4 | | | | | 6, 7 |
| 4 (1:9) | D | 4, 5, 6, 7, 8 | | | | | |
| | U | 4, 6, 7, 8 | | | | | |

When the UE feedbacks NACK due to PDSCH reception failure, the corresponding PDSCH is retransmitted by the HARQ process until an ACK signal is fed back to the BS or a timeout occurs and the retransmissions are stopped. Such retransmissions occur at the downlink channel with relatively low channel gain. Compared with the FDD system, the flexible duplex system permitting downlink data transmission in both the downlink band and the uplink band may have a larger number of available downlink channels, achieving higher selection diversity (in selecting a channel with high gain). In particular, additionally available downlink channels are present in the uplink band whose average effective channel gain is higher than that of the downlink band, leading to a gain in the error probability.

Next, a description is given of a scheme for the BS supporting flexible duplexing to determine the PDSCH retransmission timing and band after reception of NACK feedback from the UE in consideration of the selection diversity and error probability.

Figure 7A:
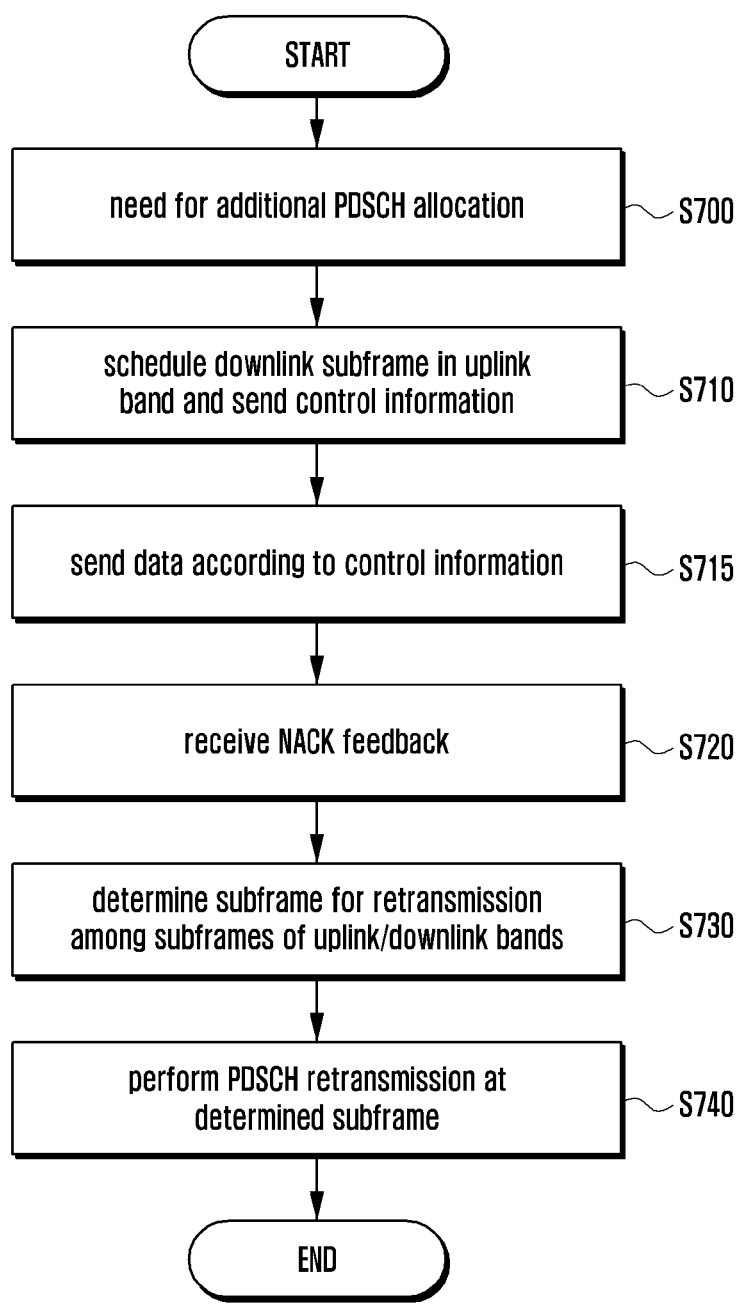
FIG. 7A is a flowchart of a procedure for a base station to schedule PDSCH retransmission in the flexible duplex system, according to an embodiment of the present disclosure.

FIG. 7A is a flowchart of a procedure for the BS to schedule PDSCH retransmission in the flexible duplex system according to an embodiment of the present disclosure.

Figure 7B:
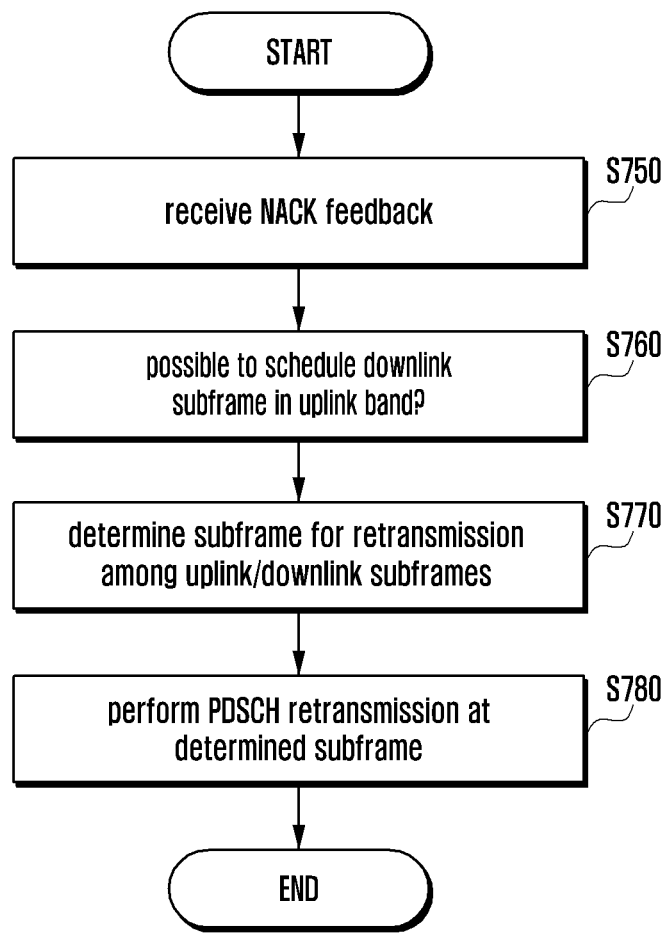
FIG. 7B is a flowchart of a procedure for a base station to schedule PDSCH retransmission in the flexible duplex system, according to another embodiment of the present disclosure.

FIG. 7B is a flowchart of a procedure for a BS to schedule PDSCH retransmission in the flexible duplex system, according to another embodiment of the present disclosure FIG. 7A illustrates a case where NACK is fed back after a subframe of the uplink band is scheduled for the downlink, and FIG. 7B illustrates a case where NACK is fed back after a subframe of the uplink band is not scheduled for the downlink.

The BS may schedule a downlink subframe in the uplink band in consideration of downlink and uplink traffic and notify the UE using the first notification scheme or the second notification scheme. After reception of the notification information from the BS, as the UE may identify the position of the subframe of the uplink band allocated for the downlink, it may receive downlink data even in the uplink band by using a downlink RF chain at the point in time corresponding to the identified subframe position.

Referring to FIG. 7A, at step S700, the BS determines that there is a need for additional PDSCH allocation. At step S710, the BS schedules a downlink subframe in the uplink band and sends corresponding control information to the UE. Here, the BS may notify the UE of the scheduling information by use of the first notification scheme or the second notification scheme. At step S715, the BS sends data to the UE according to the control information. At step S720, the BS receives NACK feedback from the UE. At step S730, in order to assign the PDSCH to be retransmitted first to a channel with high channel gain, the BS determines the band to be used for retransmission from among the uplink band and the downlink band. Specifically, to retransmit the PDSCH associated with NACK feedback from the UE, the BS may determine the band and subframe time to be used for retransmission in consideration of the effective channel gain and scheduling sequence of the subframe of the uplink band allocated for the downlink.

When NACK feedback is received from the UE, to prevent further PDSCH reception error, the BS may select the band to be used for PDSCH retransmission from among the uplink band and the downlink band, in consideration of the effective channel gain. In particular, if the uplink band has a higher gain in error probability for PDSCH retransmission, the BS may schedule a downlink subframe in the uplink band. When the BS schedules a downlink subframe in the uplink band at step S730, it may notify the UE according to the first notification scheme or the second notification scheme. Thereafter, at step S740, the BS performs PDSCH retransmission at the determined subframe. Here, the BS may resend the corresponding data and HARQ process number on the PDSCH without a new data indicator (NDI). The UE may recognize this PDSCH as a retransmission on the basis of data without NDI.

Referring to FIG. 7B, for retransmission after reception of NACK feedback, the BS may schedule a downlink subframe in the uplink band. When channel reciprocity holds, the BS may measure downlink channel information in the uplink band. At step S750, the BS receives NACK feedback. At step S760, the BS determines whether it is possible to schedule a downlink subframe in the uplink band. That is, the BS may check whether flexible duplexing is supported. If flexible duplexing is supported, at step S770, the BS determines a subframe to be used for retransmission on the basis of the results of a comparison between the downlink band and the uplink band, in terms of channel conditions. That is, if retransmission via the uplink band has an advantage over retransmission via the downlink band in terms of the effective channel gain and error probability, the BS may schedule a downlink subframe in the uplink band. Thereafter, at step S780, the BS performs PDSCH retransmission at the determined subframe.

Next, for a flexible duplex CA system, a description is given of a scheme for scheduling a downlink subframe in the uplink band.

First, a description is given of a case where whether a subframe of the uplink band is allocated for the downlink is notified on a subframe basis using the first notification scheme. When cross-carrier scheduling is used by the flexible duplex system, it is possible to consider the following instances. First, the primary serving cell (PSC) supports flexible duplexing. Second, the secondary serving cell (SSC) supports flexible duplexing. Third, both the PSC and the SSC support flexible duplexing.

In the first notification scheme, when the flexible duplex system uses a new control signal for band borrowing notification, this signal is not related to CA and does not have to be considered. However, in the case of carrier aggregation employing cross-carrier scheduling, when an existing signal is used for band borrowing notification according to the first notification scheme, the CIF being used for SCC notification is not available for band borrowing notification. Hence, to use the CIF for notifying whether a subframe of the uplink band is allocated for the downlink in the flexible duplex CA system, it is necessary to extend the CIF. In this case, a legacy UE may refer to a portion of the extended CIF to use the existing CIF.

When the BS sends the UE a flexible duplex configuration index according to the second notification scheme, it is also possible to consider the following instances. First, the primary serving cell (PSC) supports flexible duplexing. Second, the secondary serving cell (SSC) supports flexible duplexing. Third, both the PSC and the SSC support flexible duplexing.

When the second notification scheme is used, as it is necessary to send a flexible duplex configuration index only, the PSC or SSC supporting flexible duplexing only has to send a configuration index to the UE so that the UE may utilize the flexible duplex CA system.

Next, a description is given of a spectrum switching algorithm for the BS performing PDSCH retransmission in response to NACK feedback from the UE.

For downlink HARQ processing, the current FDD-LTE system using 3 bits for HARQ process numbers may support up to eight HARQ processes. However, the flexible duplex system using additional downlink subframes in the uplink band has a larger number of downlink subframes to which a HARQ process number is to be assigned in comparison to a regular FDD system. Here, for the purpose of backward compatibility, it is possible to consider using three bits for HARQ process assignment or using four or more bits for HARQ process assignment.

First, a description is given of using 3 bits for HARQ process numbers as in the case of an existing FDD system. When the flexible duplex system use the same HARQ process assignment scheme as the current FDD system, it has to support feedback for downlink subframes scheduled in the uplink and downlink bands by using up to eight HARQ processes only. Hence, in addition to a HARQ process number, the BS may send the UE an uplink/downlink indicator indicating the band associated with the HARQ process number.

Next, a description is given of using an additional HARQ process for a downlink subframe in the uplink band. When four or more bits are used for HARQ process assignment, the flexible duplex system may use HARQ process numbers from 0 to 7 for downlink subframes in the downlink band as in the case of the current FDD system, and may further use HARQ process numbers 8 or greater for additional downlink subframes in the uplink band. As such, for flexible duplexing, it is possible to assign HARQ processes to the downlink band and the uplink band.

For uplink HARQ processing, eight HARQ processes may be arranged in sequence and processed in synchronization. Hence, the HARQ process assigned to the subframe of the uplink band allocated for the downlink may be placed in the idle state, enabling uplink HARQ processing in flexible duplexing.

Figure 8:
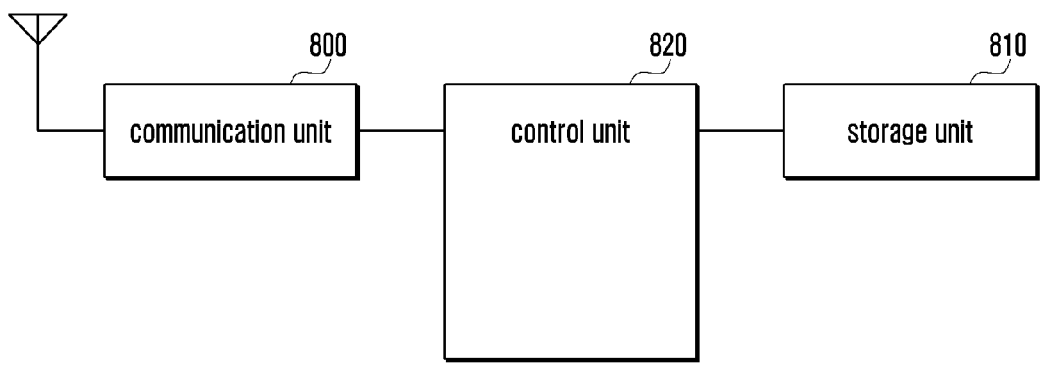
FIG. 8 is a block diagram of a base station, according to an embodiment of the present disclosure.

FIG. 8 is a block diagram of a base station, according to an embodiment of the present disclosure.

Referring to FIG. 8, the BS includes a communication unit 800, a storage unit 810, and a control unit 820.

The communication unit 800 may send and receive information needed for operation of the BS. More specifically, for flexible duplexing, the communication unit 800 may send the UE control information indicating whether a subframe of the uplink band is allocated for the downlink. The communication unit 800 may also send the UE an index to configuration information indicating a downlink subframe allocated in the uplink band. The communication unit 800 may send data to the UE according to the control information. The communication unit 800 may receive feedback on the sent data from the UE.

The storage unit 810 may store information needed for operation of the BS. The storage unit 810 may pre-store configuration information indicating a downlink subframe allocated in the uplink band, where the configuration information is sent to the UE. The storage unit 810 may store information regarding the time and frequency band at which the UE has to send feedback to the BS according to the configuration information.

The control unit 820 may control the overall operation of the BS. The control unit 820 may control a process of sending the UE control information indicating whether a subframe of the uplink band is allocated for the downlink, sending data to the UE in at least one subframe according to the control information, and receiving feedback on the sent data from the UE on the basis of TTI bundling.

For data sent at a first subframe, the control unit 820 may control an operation to receive feedback based on TTI bundling at a subframe in the uplink band after four subframes from the first subframe. The control unit 820 may control a process of measuring traffic in the uplink band and downlink band, determining whether to use at least one subframe of the uplink band for the downlink on the basis of the measurement result, and sending control information corresponding to the determination result. The control information may be sent through at least one of system information, RRC signaling, MAC layer signaling, and PHY layer signaling. The control information may include configuration information indicating a subframe of the uplink band to be used for the downlink. The configuration information may include information regarding the time and frequency band in which the UE is to send feedback on the sent data.

When NACK feedback for the sent data is received from the UE, the control unit 820 may control an operation to determine the point in time and frequency band for a subframe at which the data associated with the NACK feedback is to be retransmitted.

Figure 9:
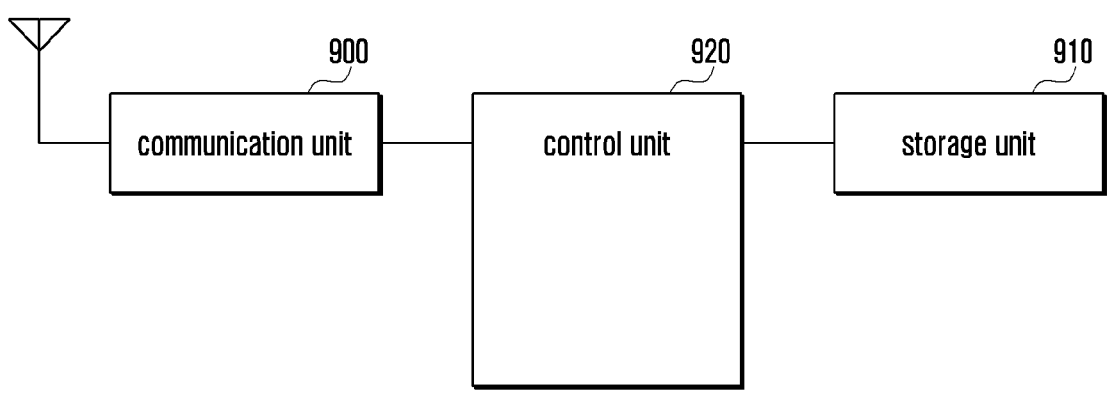
FIG. 9 is a block diagram of a user equipment according to an embodiment of the present disclosure.

FIG. 9 is a block diagram of a user equipment, according to an embodiment of the present disclosure.

Referring to FIG. 9, the UE includes a communication unit 900, a storage unit 910, and a control unit 920.

The communication unit 900 may send and receive information needed for operation of the UE. The communication unit 900 may receive control information for flexible duplexing from the BS. For flexible duplexing, the communication unit 900 may receive control information indicating whether a subframe of the uplink band is allocated for the downlink from the BS. The communication unit 900 may receive an index to configuration information indicating a downlink subframe allocated in the uplink band.

The communication unit 900 may receive data according to the control information. The communication unit 900 may send feedback on the received data to the BS. The communication unit 900 may send the feedback by use of TTI bundling.

The storage unit 910 may store information needed for operation of the UE. The storage unit 910 may pre-store configuration information indicating a downlink subframe allocated in the uplink band. The storage unit 910 may store information regarding the time and band in which the UE has to send feedback to the BS according to the configuration information.

The control unit 920 may control a process of receiving control information indicating whether a subframe of the uplink band is allocated for the downlink from the BS, receiving data from the BS at three or more subframes according to the control information, and sending the BS feedback for the data received at the three or more subframes on the basis of TTI bundling.

The control unit 920 may control a process of receiving data from the BS in at least three subframes including a first subframe of the uplink band scheduled for the downlink by the control information, a second subframe of the downlink band at the same time as the first subframe, and a third subframe of the downlink band before four subframes from the second subframe.

For the received data, the control unit 920 may control an operation to send feedback based on TTI bundling at a fourth subframe in the uplink band after four subframes from the first subframe. The control information may be received through at least one of system information, RRC signaling, MAC layer signaling, and PHY layer signaling. The control information may include an index to the pre-stored configuration information indicating a subframe of the uplink band allocated for the downlink. In addition, the control unit 920 may control a process of receiving data from the BS in at least one subframe according to the configuration information, and sending feedback on the received data to the BS using information regarding the time and frequency band for feedback determined based on the configuration information.

In an embodiment of the present disclosure, a method and apparatus for a flexible duplex system is provided. The base station may notify the user equipment of uplink subframes allocated for the downlink and the user equipment may send feedback on received data to the base station. Hence, the base station may receive accurate and effective feedback on the data received by the user equipment in a flexible duplex system.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications will still fall within the spirit and scope of the present disclosure as defined in the appended claims and their equivalents.

What is claimed is:

1. A method of feedback transmission for a user equipment in a wireless communication system, the method comprising:
    receiving, from a base station, configuration information for configuring a frequency divisional duplex (FDD) mode;
    receiving, from the base station, control information indicating whether at least one subframe of an uplink band is allocated for a downlink subframe;
    receiving, from the base station, data in the at least one subframe of the uplink band according to the control information and at least two subframes of a downlink band according to the configuration information; and
    transmitting, to the base station, feedback for the data received in the at least one subframe of the uplink band and the at least two subframes of the downlink band using bundling.

2. The method of claim 1, wherein the control information is based on downlink control information (DCI).

3. The method of claim 1, wherein the at least one subframe includes at least one of a first subframe of the uplink band scheduled for the downlink subframe as indicated by the control information, and the at least two subframes include a second subframe of the downlink band scheduled at the same time as the first subframe of the uplink band and a third subframe of the downlink band scheduled four subframes preceding the second subframe.

4. The method of claim 2, wherein the control information is based on a carrier indicator field (CIF) contained in the DCI or based on a band borrowing notification field contained in the DCI.

5. A method of feedback reception for a base station in a wireless communication system, the method comprising:
   transmitting, to a user equipment (UE), configuration information for configuring a frequency divisional duplex (FDD) mode;
   transmitting, to the UE, control information indicating whether at least one subframe of an uplink band is allocated for a downlink subframe;
   transmitting, to the UE, data in the at least one subframe of the uplink band according to the control information and at least two subframes of a downlink band according to the configuration information; and
   receiving, from the UE, feedback for the data transmitted in the at least one subframe of the uplink band and the at least two subframes of the downlink band using bundling.

6. The method of claim 5, wherein the control information is based on downlink control information (DCI).

7. The method of claim 6, wherein the at least one subframe includes at least one of a first subframe of the uplink band scheduled for the downlink as indicated by the control information, and the at least two subframes include a second subframe of the downlink band scheduled at the same time as the first subframe of the uplink band and a third subframe of the downlink band scheduled four subframes preceding the second subframe.

8. The method of claim 6, wherein the control information is based on a carrier indicator field (CIF) contained in the DCI or based on a band borrowing notification field contained in the DCI.

9. The method of claim 5, wherein sending control information comprises:
   measuring traffic in the uplink band and downlink band; and
   determining whether to use the at least one subframe of the uplink band for the downlink subframe on the basis of the measurement result, and transmitting control information corresponding to the determination result.

10. The method of claim 5, further comprising determining, when NACK feedback for the transmitted data is received from the UE, a point in time and a frequency band for a subframe in which the data associated with the NACK feedback is to be retransmitted in consideration of a channel gain.

11. A user equipment, capable of feedback transmission in a wireless communication system, comprising:
   a transceiver; and
   a controller configured to control the transceiver to receive configuration information for configuring a frequency divisional duplex (FDD) mode from a base station, control the transceiver to receive control information indicating whether at least one subframe of an uplink band is allocated for a downlink subframe from the base station, control the transceiver to receive data from the base station in the at least one subframe of the uplink band according to the control information and at least two subframes of a downlink band according to the configuration information, and control the transceiver to transmit feedback to the base station for the data received in the at least one subframe of the uplink band and the at least two subframes of the downlink band using bundling.

12. The user equipment of claim 11, wherein the control information is based on downlink control information (DCI).

13. The user equipment of claim 11, wherein the at least one subframe includes at least one of a first subframe of the uplink band scheduled for the downlink subframe as indicated by the control information, and the at least two subframes include a second subframe of the downlink band schedule at the same time as the first subframe of the uplink band and a third subframe of the downlink band scheduled four subframes preceding the second subframe.

14. The user equipment of claim 12, wherein the control information is based on a carrier indicator field (CIF) contained in the DCI or based on a band borrowing notification field contained in the DCI.

15. A base station capable of feedback reception in a wireless communication system, comprising:
   a transceiver configured to send and receive signals; and
   a controller configured to control the transceiver to transmitting configuration information for configuring a frequency divisional duplex (FDD) mode to a user equipment (UE), control the transceiver to transmit control information indicating whether at least one subframe of an uplink band is allocated for a downlink subframe to the UE, control the transceiver to transmit data to the UE in the at least one subframe of the uplink band according to the control information and at least two subframes of a downlink band according to the configuration information, and control the transceiver to receive feedback for the data transmitted in the at least one subframe of the uplink band and the at least two subframes of the downlink band from the UE using bundling.

16. The base station of claim 15, wherein the control information is based on downlink control information (DCI).

17. The base station of claim 16, wherein the at least one subframe includes at least one of a first subframe of the uplink band scheduled for the downlink as indicated by the control information, and the at least two subframes include a second subframe of the downlink band scheduled at the same time as the first subframe of the uplink band and a third subframe of the downlink band scheduled four subframes preceding second subframe.

18. The base station of claim 16, wherein the control information is based on a carrier indicator field (CIF) contained in the DCI or based on a band borrowing notification field contained in the DCI.

19. The base station of claim 15, wherein the control unit is further configured to:
   control a process of measuring traffic in the uplink band and downlink band;
   determine whether to use the at least one subframe of the uplink band for the downlink subframe on the basis of the measurement result; and
   transmit control information corresponding to the determination result.

20. The base station of claim 15, wherein, when NACK feedback for the transmitted data is received from the UE, the control unit is further configured to determine a point in time and a frequency band for a subframe in which the data associated with the NACK feedback is to be retransmitted in consideration of at least one of a channel gain and an error probability.

* * * * *